INVENTORS
J. D. McGREGOR
J. C. WAGGONER
W. A. WHITTEN
BY Brown & Rosen

March 2, 1965  J. D. McGREGOR ETAL  3,171,639
DRYER CONTROL APPARATUS

Filed Aug. 30, 1962  4 Sheets-Sheet 2

United States Patent Office 3,171,639
Patented Mar. 2, 1965

3,171,639
DRYER CONTROL APPARATUS
James Daniel McGregor, Jerry C. Waggoner, and Wesley A. Whitten, Borger, Tex., assignors to J. M. Huber Corporation, Monmouth, N.J., a corporation of New Jersey
Filed Aug. 30, 1962, Ser. No. 220,371
11 Claims. (Cl. 263—34)

The present invention relates to a dryer and particularly to automatic temperature controls for gas-fired rotary dryers.

The primary object of the invention is to provide a dryer in which the product is uniformly dried without over heating or under drying.

Another object of the invention is to provide a dryer of the class described above in which the product is dried to a uniform moisture content with the temperature maintained beneath a critical level.

In wet process pelletizing, carbon black is fed into a cylindrical pelletizer having agitator pins therein. Water is sprayed into the black so that the pellets formed have a ratio of approximately one pound of water for each pound of carbon black. The wet pellets must be dried in order to meet the user's specifications and to obtain the desired strength for shipping. The pellets are usually heated to approximately 400° F. in an indirect rotary gas dryer to be certain that the pellets are definitely dry. The flow of carbon black to a pelletizer varies considerably from time to time so that an unsteady flow to the dryer results. Due to this unsteady flow, the length of time it takes for black to travel through the dryer and the length of time for a change in temperature in the furnace to change the temperature of the rotating shell which in turn changes the temperature of the black, makes it very hard to hold the proper temperature of the black. When the carbon black gets too hot, its properties suffer, reducing the value of the black; and if it is not hot enough, too much moisture will be left in the black. Since all black is produced to exacting specifications, it is imperative that the drying operation be carried out in an essentially uniform manner.

One of the chief problems encountered in the drying of carbon black is that during the period that the black is giving up its moisture no appreciable temperature change occurs in the black; but immediately upon the black becoming completely dry, it will then heat very rapidly toward an excessive temperature.

Other objects and advantages will become apparent in the following specification when considered in light of the attached drawings in which.

Figure 1:
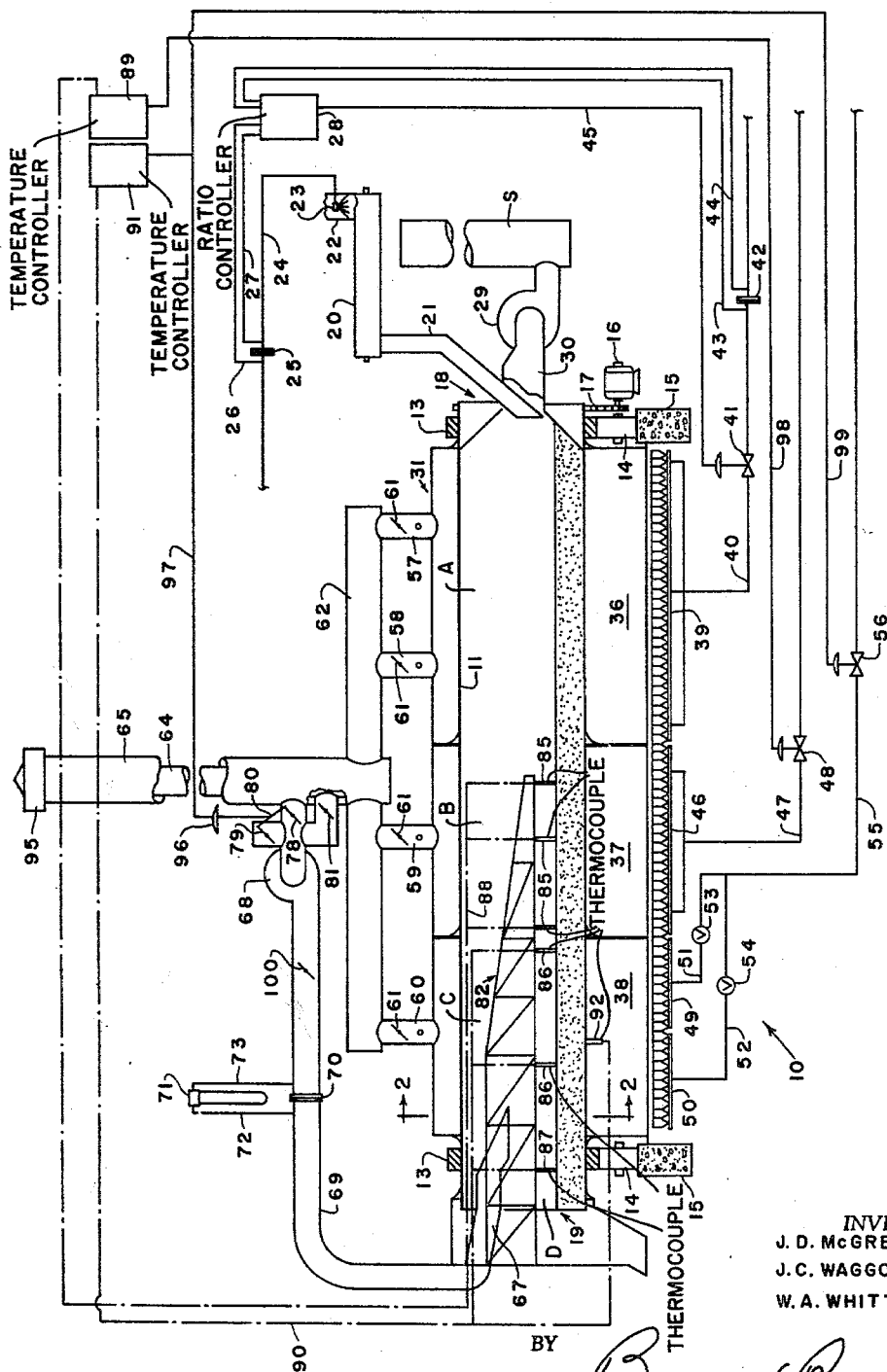
FIGURE 1 is a semi-diagrammatic sectional view of the invention.

Referring now to the drawings in detail wherein like reference characters indicate like parts throughout the several figures, the reference numeral 10 indicates generally a dryer constructed in accordance with the invention.

The dryer 10 includes an elongated rotary drum 11 having a plurality of internally disposed lifter blades 12 extending longitudinally thereof. The drum 11 has external support rings 13 secured to each end thereof and supported for rotation on rollers 14 mounted on foundations 15. A motor 16 is positioned adjacent one end of the drum 11 for rotating the drum 11 through a chain and sprocket drive 17.

The dryer 10 has an inlet end generally indicated at 18 and an outlet end generally indicated at 19. A wet pelletizer 20 is positioned adjacent the inlet end 18 of the dryer 10 and has a discharge conduit 21 extending from its outlet end into the inlet end 18 of the dryer 10. The pelletizer 20 has an inlet conduit 22 containing a water spray 23, as can be best seen in FIGURE 1. A water line 24 extends to the water spray 23 and has an orifice 25 positioned therein. Differential pressure lines 26, 27 extend from opposite sides of the orifice 25 to a control unit 28. The differential pressure lines 26, 27 determine the rate of flow of water through the water line 24 and feed this information to the control unit 28.

A rotary air pump 29 is also positioned adjacent the inlet end 18 of the dryer 10 and is adapted to draw air and vapor through a conduit 30 from the inlet end 18 of the dryer 10 exhausting it through a stack S.

An inverted U-shaped housing generally indicated at 31 extends longitudinally of the drum 11 from a point adjacent one of the supporting rings 13 to a point adjacent the other of the supporting rings 13 at opposite ends of the drum 11. The housing 31 has an insulating core 32 to prevent the escape of heat therefrom. A transverse partition 33 is positioned within the housing 31 surrounding the drum 11 and a second partition 34 also extends transversely of the housing 31 parallel to the partition 33 and spaced apart therefrom. A plurality of flexible flaps 35 are secured to the partitions 33 and 34 in a ring-shaped form contacting the drum 11. The partitions 33, 34 and their respective flaps 35 divide the housing into an inlet compartment 36, a central compartment 37, and a discharge compartment 38. A gas heating element 39 is positioned in the lower end of the inlet compartment 36 and receives gas through a gas line 40 controlled by a motor valve 41. An orifice plate 42 is positioned in the gas line 40 and a pair of differential pressure lines 43, 44 extend from opposite sides of the orifice plate 42 to the control unit 28. A control line 45 extends from the control unit 28 to the motor valve 41 to control the flow of gas in the line 40 in response to the flow of gas in the line 40 as well as in response to the flow of water in the line 24.

A gas heating burner 46 is positioned in the central compartment 37 and is fed by a gas line 47 controlled by a motor control valve 48. A gas heating burner 49 and a second gas heating burner 50 are positioned in the compartment 38 and are fed respectively by gas lines 51, 52 controlled by hand valves 53, 54 respectively. The gas lines 51, 52 are fed from a gas line 55 controlled by a motor control valve 56.

The drum 11 has a zone A at the inlet end thereof which is primarily heated by the burner 39 in the compartment 36; a zone B is adjacent thereto and is primarily heated by burner 46 in compartment 37. Another zone C in the drum 11 is positioned next to zone B and is primarily heated by burners 49, 50 while zone D is at the outlet end of the drum 11 and has no burners associated therewith.

Figure 5:
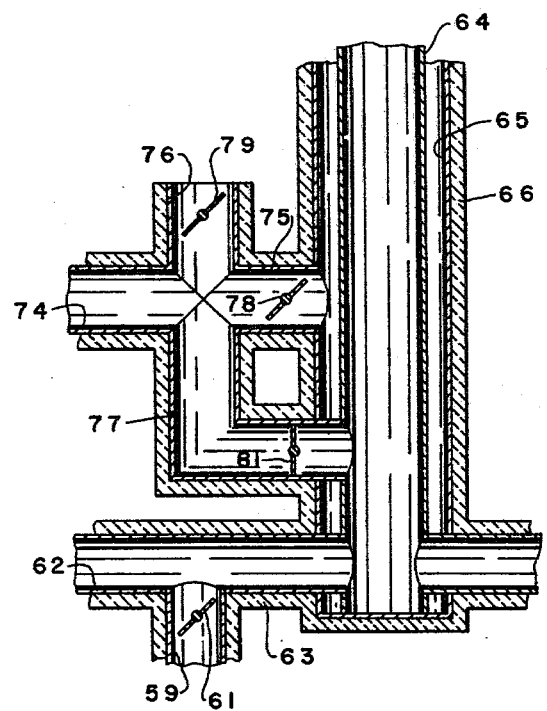
FIGURE 5 is a vertical sectional view of a detail of the invention.

A pair of outlet conduits 57, 58 extend upwardly from the housing 31 communicating with the compartment 36. An outlet conduit 59 extends upwardly from the housing 31 communicating with the compartment 37 and an outlet conduit 60 also extends upwardly from the housing 31 communicating with the compartment 38. Each of the outlet conduits 57, 58, 59 and 60 are provided with adjustable dampers 61. A horizontal manifold 62 communicates with each of the outlet conduits 57, 58, 59 and 60, as can be seen in FIGURE 1. The outlet conduits 57, 58, 59 and 60 as well as the manifold 62 are all provided with an insulating coating 63 as seen in FIGURE 5. A vertical stack 64 extends upwardly from the manifold 62 and is provided with a concentric outwardly spaced air conduit 65 arranged in completely encompassing relation to the stack 64. The air conduit 65 has an insulating coating 66 arranged in encompassing relation thereon.

Figure 4:
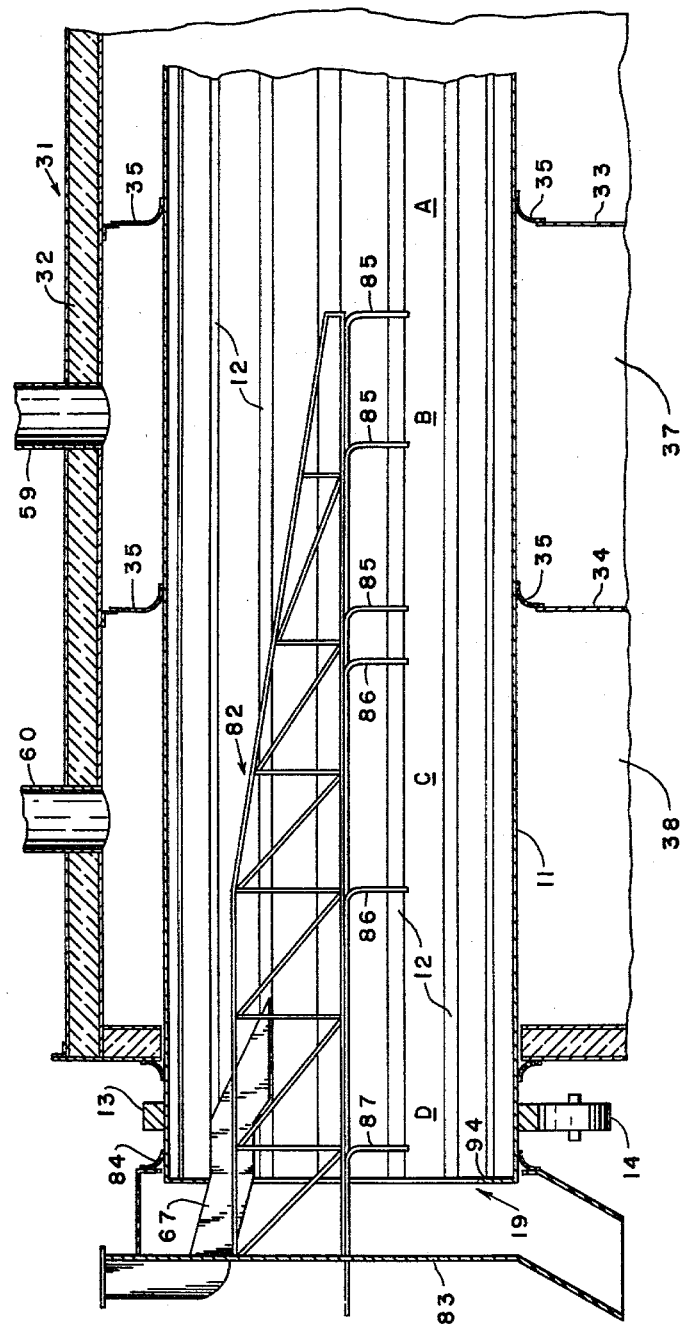
FIGURE 4 is a vertical fragmentary longitudinal sectional view taken along line 4—4 of FIGURE 2, looking in the direction of the arrows.

An air discharge tube 67 extends into the outlet end 19 of the drum 11 as can be seen in FIGURES 1 and 4. An air pump 68 is positioned adjacent the manifold 62 with its discharge side connected to the air inlet tube 67 by means of a conduit 69. An orifice plate 70 is positioned in the conduit 69 and a manometer 71 is connected to opposite sides of the orifice plate 70 by differential pressure lines 72, 73.

An insulated conduit 74 extends from the inlet end of the air pump 68 and is connected by a conduit 75 to the air conduit 65. A pipe 76 extends to the atmosphere from the inlet conduit 74 and a second pipe 77 extends to the stack 64 from the inlet conduit 74 all as seen in FIGURE 5. A damper 78 is positioned in the conduit 75 and a second damper 79 is positioned in the pipe 76. The dampers 78, 79 are operatively connected by a link 80 arranged so that with one of the dampers 78, 79 fully open the other of the dampers 78, 79 will be fully closed, and vice versa. A rotatable damper 81 is positioned in the pipe 77 and arranged so that the pipe 77 may be fully closed or fully opened as desired.

Figure 2:
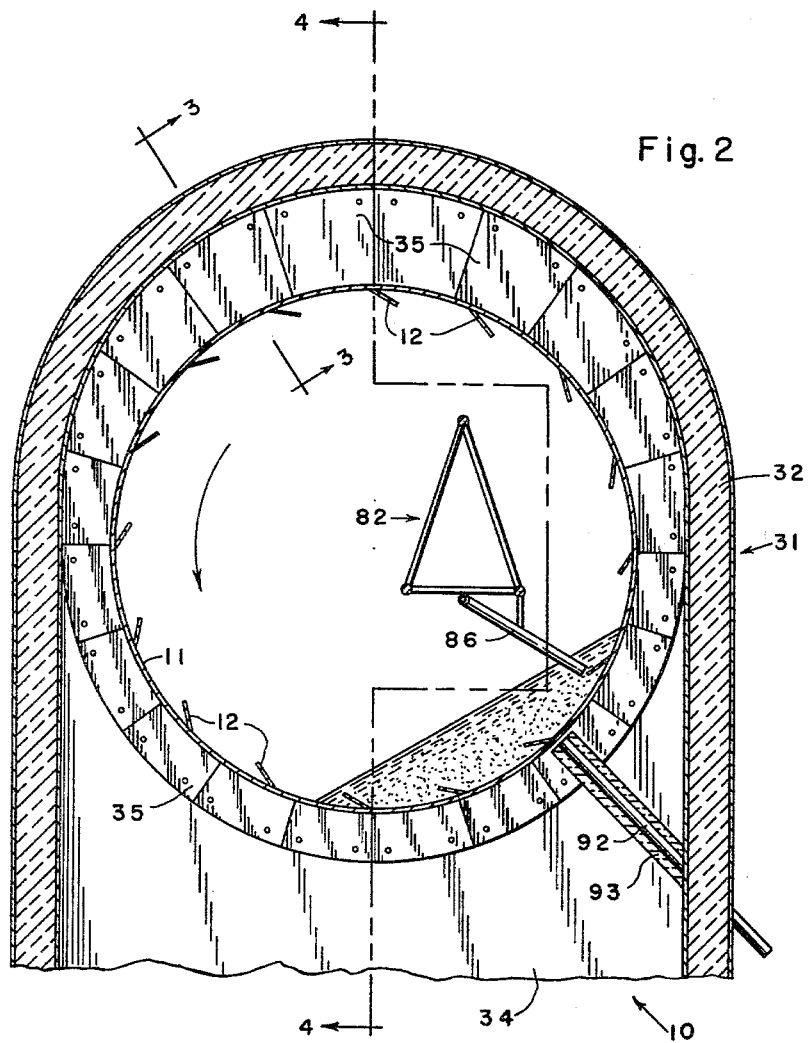
FIGURE 2 is an enlarged fragmentary transfer section taken along the line 2—2 of FIGURE 1, looking in the direction of the arrows.
Figure 6:
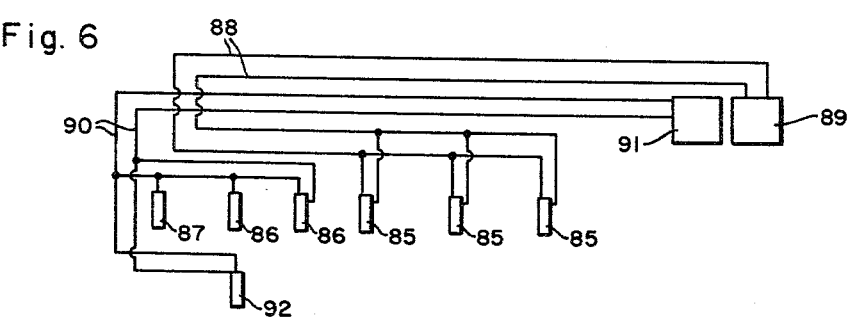
FIGURE 6 is a wiring diagram of the electrical portions of the invention.
Figure 3:
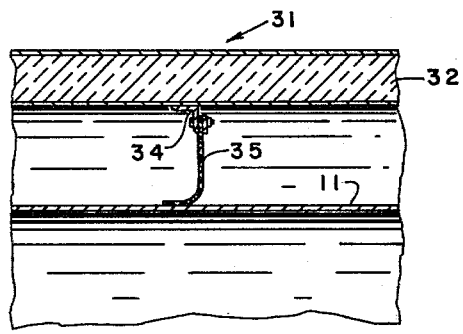
FIGURE 3 is an enlarged fragmentary sectional view taken along the line 3—3 of FIGURE 2, looking in the direction of the arrows.

A boom truss generally indicated at 82 extends into the discharge end of the drum 11 and has a generally triangularly cross-section, as can be seen in FIGURE 2. The boom truss 82 is supported on a discharge housing 83, which encompasses the discharge end 19 of the drum 11 and is arranged for connection to an enclosed conveyor system (not shown). A flexible seal 84 extends between the discharge housing 83 and the drum 11 to prevent leakage of air therebetween. A plurality of longitudinally spaced thermocouples 85 are supported on the truss 82 in downwardly and outwardly extending position for engagement with carbon black within the drum 11. The thermocouples 85 are arranged in zone B of the drum 11 as can be seen in FIGURE 1. A pair of thermocouples 86 are supported on the truss 82 in downwardly and outwardly extending position in zone C of drum 11 and still another thermocouple 87 is supported on the truss 82 in zone D of the drum 11 in downwardly and outwardly extending position. The thermocouples 85 are connected by a two conductor electric line 88 to a control unit 89 while thermocouples 86, 87 are connected by a two conductor electric line 90 to a control unit 91. A thermocouple 92 is mounted in the housing 31 outside of the drum 11 but adjacent the outer surface thereof within the compartment 38, as can be seen in FIGURES 1 and 2. The thermocouple 92 has an insulated coating 93 thereon to insure accurate measurement of the heat in the compartment 38. The thermocouple 92 is connected by a two conductor electric line 90 to the control unit 91.

The outlet end 19 of the drum 11 has a ring-shaped dam 94 formed thereon to retain a predetermined level of black within the drum 11 during the drying operations therein.

The controllers used in carrying out the present invention are commercially available from several manufacturers among which is The Foxboro Company, Foxboro, Massachusetts. The controllers are described in Foxboro Bulletin 5A-10A. The control unit 28 of applicant's invention is the Ratio Controller described on page 16 of the bulletin. The temperature controllers 89 and 91 are the Single Action Controller described on page 11 of the bulletin.

In the use and operation of the invention, carbon black is pelletized by prior art wet processes in a cylindrical pelletizer having agitator pins therein. The carbon black is fed in at the inlet end of the pelletizer where simultaneously water is also sprayed in at a rate of approximately one pound for each pound of carbon black. The carbon black comes out of the pelletizer in small balls or pills in a condition of approximately one-half water. The moisture in the pelletized black must be removed to produce a uniform product which will remain stable in shipping. The pellets are normally heated to a temperature of approximately 400° F. to make certain that they are definitely dry. In the normal operation of a carbon black furnace, a considerable variance in the production of carbon black occurs during a 24-hour operation so that the flow of black to a pelletizer is not uniform. Due to this unsteady flow, the length of time it takes for the black to travel through the dryer as well as the length of time for a change of temperature in the dryer to change the temperature of the rotating shell, which in turn changes the temperature of the black, makes it very hard to obtain and hold the proper temperature in the black. If the black gets too hot, it adversely affects the properties of the black when used in the manufacture of other products; if not hot enough, there will be moisture left in the black causing the black to be rejected for not complying with manufacturers' specifications.

The manual control of the temperature of the black in prior art dryer systems is very difficult and even impossible since the temperature of the black will vary over a great range and manual controls are not sufficiently sensitive to cause the temperature to come to equilibrium. The major problem existing in the drying of carbon black is that no appreciable temperature change occurs in the black during the period that the black is giving up water but immediately upon the black becoming dry, further application of heat causes the black to heat up very rapidly.

In practicing the present invention, the dryer has been provided with an automatic temperature control to keep the temperature of the black within a close range. The dryer has been divided into three compartments 36, 37 and 38 with the compartment 36 at the inlet end of the dryer including approximately 43% of the effective heat transfer surface of the dryer. The central compartment 37 includes approximately 27% of the effective heat transfer surface of the dryer and the outlet compartment 38 includes approximately 30% of the effective heat transfer surface of the dryer.

The gas heater elements 39, 46, 49 and 50 are divided similarly to the compartments with the element 39 comprising 68% of the total heating elements. The element 46 in the central compartment 37 comprises 21% of the total heating elements and the heating element 49, 50 together comprise 11% of the total heating element.

The partitions 33, 34 between the compartments 36, 37, 38 respectively are tightly sealed with high temperature fiber flaps 35 to the rotary drum 11 and the drum 11 is also sealed to the outlet housing 83 by a high temperature fiber flexible seal 84. The flaps 35 prevent any combustion gas from one compartment from affecting the temperature of any other compartment. The seal 84 prevents any leakage of air into or out of the dryer. The sealing of the dryer drum and the housing 31 prevents outside air currents from affecting the flow of combustion gas or preheated air within the dryer.

A stationary ventilator 95 is placed on the upper end of the stack 64 and air conduit 65 to eliminate wind affecting the draft on these ducts.

The outlet conduits 57, 58, 59 and 60 each have an adjustable damper 61 positioned therein to control the flow of products of combustion therethrough which in turn will control the air to the burners 39, 46, 49 and 50. The outlet conduits 57, 58, 59 and 60 are mutually connected to a manifold 62 which in turn communicates with a vertical stack 64 extending to the atmosphere. An air conduit 65 surrounds the stack 64 and is open at the top to admit fresh air which is preheated by the hot gases passing through the stack 64 to a temperature of approximately 560° F. Preheated air from the air conduit 65 passes into pipe 75 past damper 78 into the inlet conduit 74 of the air pump 68. Ambient air is pulled through pipe 76 past damper 79 into the inlet conduit 74 of the air pump 68. Dampers 78, 79 are interconnected by a link 80 so that the desired ratio of preheated air and ambient air may be obtained. Combustion gases from the stack 64 pass through the pipe 77 past the damper 81 and into the inlet conduit 74 of the air pump 68. The link 80 is actuated by a motor 96 connected by a line 97 to the control unit 91. The motor valve 48 is connected by a line 98 to the control unit 89 and the motor valve 56 is connected by a line 99 to the control unit 91.

The discharge from the air pump 68 passes a control damper 100 and orifice plate 70 to be discharged through an air discharge tube 67 within the outlet end 19 of the drum 11. The air discharge tube 67 evenly spreads the tempered air over the surface of all the carbon black within compartment 38 of the drum 11. The tempered air serves two purposes: it is used to raise or lower the temperature of the black to a very small tolerance of moisture content just before it leaves the dryer. This air is also used to carry the stream out at the inlet and through another stack S. It is important to have the tempered air metered and controlled by a damper at the discharge of the blower in order that there will be sufficient air to carry the heat to the black but not enough that the velocity together with the steam will be great enough to pick up the small pellets and carry them out of the stack S.

There are three thermocouples 85 located in zone B of the drum 11 with the thermocouples being longitudinally spaced apart on the truss 82. These thermocouples 85 are connected in parallel to produce an average reading in the control unit 89. A pair of thermocouples 86 are also mounted on the truss 82 in spaced apart relation in zone C of drum 11 and a thermocouple 87 is mounted on the truss 82 within zone D of the drum 11 just beyond the compartment 38. A thermocouple 92 is mounted within the compartment 38 outside the drum 11 but closely adjacent thereto. The thermocouples 86, 87 and 92 are connected in parallel in order to give an average reading in the control unit 91. As can be readily seen from FIG. 1, there are no thermocouples located in zone A of drum 11 and this zone is of the size to vaporize approximately 65% of the moisture in the black. The gas heating element 39 in the compartment 36 is controlled by a motor valve 41 actuated by a control unit 28. The control unit 28 measures the water flow through the line 24 and the gas flow through the line 40 and then establishes the proper ratio of gas to water to accomplish the required vaporization as set forth above.

In zone B of drum 11 the remaining 35% of the vaporization takes place and sufficient additional heat is provided to raise the black to the desired outlet temperature of approximately 400° F. The burners 46 in compartment 37 are controlled through the thermocouples 85 by means of a motor valve 48 and a control unit 89.

Zone C of drum 11 is in general a stand-by section with its compartment 38 having a burner capacity of approximately one-half that of compartment 37. Zone C of drum 11 has a heating and cooling potential provided by air flow through the air supply tube 67 which moves either heated or cooled air into zone C of drum 11 as required by the condition of the black therein. Theoretically, the burners 49 and 50 in compartment 38 will have very little use if compartments 36 and 37 are functioning properly. The chief function of compartment 38 is as a safeguard and to control within close tolerances the discharge temperature of the black. If the black leaves zone B at too low a temperature, the thermocouples 86, 87, 92 will signal the control unit 91 which in turn will open the motor valve 56 actuating the gas heating elements 49 and 50. The control unit 91 will simultaneously actuate dampers 78, 79 to decrease the ambient air and increase the preheated air feeding the air pump 68.

In the event that the black leaves zone B at too high a temperature, the reverse action will take place with the gas heating elements 49, 50 being deactivated and the dampers 78, 79 being changed to admit a greater quantity of ambient air and a lesser quantity of preheated air to the air pump 68.

As can be clearly seen, the control system for the dryer is such that the discharge temperature of the dried material can be maintained between relatively close limits even though the input and the quantity of water contained in the input vary considerably. The system in the present invention will also automatically control the temperatures during the starting up or shutting down of the dryer when used in conjunction with a dam 94 at the discharge end 19 of the drum 11 to hold a certain level of black when there is no flow through the dryer 10.

It should be understood that combustion gases may be used in place of preheated air during the drying of certain products and the control can be maintained to the same degree of accuracy.

In describing the invention, carbon black has been used as an example of the material to be dried but it should be understood that the apparatus and system can be adapted to other pulverant materials having a high water content which must be reduced to an extremely accurately maintained low level.

Having thus described the preferred embodiment of the invention, it should be understood that numerous structural modifications and adaptations may be resorted to without departing from the scope of the appended claims.

We claim:

1. A dryer comprising an elongated horizontal drum, means mounting said drum for rotation about its horizontal axis, a housing encompassing said drum, means dividing said housing into a plurality of compartments, said drum having a zone corresponding to each of said compartments and one zone at the outlet end of said drum beyond said housing, a gas burner in each of said compartments, with each of said burners underlying one of said zones, heat sensing means supported within said drum and arranged in at least two of said zones, means regulating the supply of gas to the burners underlying the zones having heat sensing means therein, and means connecting said heat sensing means and said regulating means to effect control of said regulating means by said heat sensing means.

2. A dryer as claimed in claim 1 including means regulating the supply of gas to the burner underlying the zone at the inlet end of said drum, means sensing the moisture content of the material to be dried and means connecting said moisture content sensing means, and said last-named regulating means to effect control of said last-named regulating means by said moisture content sensing means.

3. A dryer comprising an elongated horizontal drum having material inlet and outlet ends, means mounting said drum for rotation about its horizontal axis, an insulated housing overlying said drum, means dividing said housing into inlet, central and outlet compartments, a gas heating burner in each compartment underlying said drum, said drum having a zone corresponding to and axially coextensive with each compartment and a zone at its material outlet end extending beyond said housing, heat sensing means supported in said drum within the zones corresponding with said central and said outlet compartments, means for directing a current of air through said drum from the outlet end to the inlet end thereof, means regulating the temperature of the air flowing through said drum, means regulating the flow of gas to the gas heating burners in said central and said outlet compartments, control means for simultaneously actuating the gas flow regulating means and the air temperature regulating means, means connecting said heat sensing means to said control means and means connecting said control means to said gas flow regulating means and said air temperature regulating means, with said control means actuating each of said regulating means in response to said heat sensing means.

4. A dryer as claimed in claim 3 wherein means are provided for determining the moisture content of the material to be dried and means controlling the supply of gas to the gas heating burner in said inlet compartment is controlled by said moisture content determining means.

5. A device as claimed in claim 1 wherein said heat sensing means in each zone comprises a plurality of thermocouples with all of the thermocouples in each zone wired in parallel to give an average result.

6. A device as claimed in claim 3 wherein said heat sensing means in each zone comprises a plurality of thermocouples with all of the thermocouples in each zone wired in parallel to give an average result.

7. A device as claimed in claim 4 where in said heat sensing means in each zone comprises a plurality of thermocouples with all of the thermocouples in each zone wired in parallel to give an average result.

8. A dryer as claimed in claim 3 wherein said means regulating the temperature of the air comprises a combustion gas stack extending upwardly from said housing, an air conduit encompassing said stack and means controlling the flow of air through said air conduit.

9. A dryer as claimed in claim 4 wherein said means regulating the temperature of the air comprises a combustion gas stack extending upwardly from said housing, an air conduit encompassing said stack and means controlling the flow of air through said air conduit.

10. A dryer as claimed in claim 6 wherein said means regulating the temperature of the air comprises a combustion gas stack extending upwardly from said housing, an air conduit encompassing said stack and means controlling the flow of air through said air conduit.

11. A dryer as claimed in claim 7 wherein said means regulating the temperature of the air comprises a combustion gas stack extending upwardly from said housing, an air conduit encompassing said stack and means controlling the flow of air through said air conduit.

References Cited in the file of this patent
UNITED STATES PATENTS
3,013,785    King _____ Dec. 19, 1961